US009869795B2

(12) United States Patent
Jaaskelainen

(10) Patent No.: US 9,869,795 B2
(45) Date of Patent: *Jan. 16, 2018

(54) DISTRIBUTED ACOUSTIC SENSING SYSTEM WITH VARIABLE SPATIAL RESOLUTION

(71) Applicant: Halliburton Energy Services, Inc., Houston, TX (US)

(72) Inventor: Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/907,790

(22) PCT Filed: Aug. 30, 2013

(86) PCT No.: PCT/US2013/057699
§ 371 (c)(1),
(2) Date: Jan. 26, 2016

(87) PCT Pub. No.: WO2015/030821
PCT Pub. Date: Mar. 5, 2015

(65) Prior Publication Data
US 2016/0170081 A1    Jun. 16, 2016

(51) Int. Cl.
*G01V 11/00* (2006.01)
*G01V 8/10* (2006.01)
(Continued)

(52) U.S. Cl.
CPC ............. *G01V 11/00* (2013.01); *E21B 47/00* (2013.01); *E21B 47/101* (2013.01); *E21B 47/14* (2013.01); *G01V 1/42* (2013.01); *G01V 8/10* (2013.01)

(58) Field of Classification Search
CPC .................. E21B 47/123; G01V 8/20
(Continued)

(56) References Cited
U.S. PATENT DOCUMENTS 4,931,771 A  6/1990 Kahn
5,194,847 A  3/1993 Taylor et al.
(Continued)

OTHER PUBLICATIONS

International Preliminary Report on Patentability issued in related PCT Application No. PCT/US2013/057699 dated Mar. 10, 2016, 6 pages.
(Continued)

*Primary Examiner* — Manish S Shah
*Assistant Examiner* — Jean Morello
(74) *Attorney, Agent, or Firm* — John Wustenberg; Baker Botts L.L.P.

(57) ABSTRACT

Systems and methods for distributed acoustic sensing based on coherent Rayleigh scattering are disclosed herein. A system comprises a pulse generator, an optical fiber coupled to the pulse generator, an interferometer coupled to the optical fiber, a photodetector assembly coupled to the interferometer, and an information handling system, which activates two optical gain elements so as to vary the optical path length of the interferometer. A method comprises sending an optical pulse down an optical fiber, splitting backscattered light from the optical pulse into a first backscattered pulse and a second backscattered pulse, activating a first optical gain element and a second optical gain element, sending the first backscattered pulse into a first arm of an interferometer, sending the second backscattered pulse into a second arm of an interferometer, combining the first and second backscattered pulses to form an interferometric signal, and receiving the interferometric signal at a photodetector assembly.

20 Claims, 4 Drawing Sheets

(51) Int. Cl.
*E21B 47/00* (2012.01)
*E21B 47/10* (2012.01)
*G01V 1/42* (2006.01)
*E21B 47/14* (2006.01)

(58) Field of Classification Search
USPC .............................. 73/152.58; 356/477, 478
See application file for complete search history.

(56) References Cited

U.S. PATENT DOCUMENTS

| | | | |
|---|---|---|---|
| 6,380,534 B1 | 4/2002 | Farhadiroushan et al. | |
| 7,400,408 B2 * | 7/2008 | Drabarek | G01B 9/02057 356/479 |
| 7,488,930 B2 * | 2/2009 | Ajgaonkar | G01B 9/02028 250/227.19 |
| 2004/0208648 A1 * | 10/2004 | Fishman | H04B 10/25137 398/189 |
| 2012/0162639 A1 | 6/2012 | Farhadiroushan et al. | |
| 2012/0293806 A1 * | 11/2012 | Cranch | G01D 5/35383 356/477 |
| 2013/0100768 A1 | 4/2013 | Lopez et al. | |

OTHER PUBLICATIONS

International Search Report and Written Opinion issued in related PCT Application No. PCT/US2013/057699 dated May 19, 2014, 9 pages.

\* cited by examiner

DISTRIBUTED ACOUSTIC SENSING SYSTEM WITH VARIABLE SPATIAL RESOLUTION

CROSS-REFERENCE TO RELATED APPLICATION

The present application is a U.S. National Stage Application of International Application No. PCT/US2013/057699 filed Aug. 30, 2013, which is incorporated herein by reference in its entirety for all purposes.

BACKGROUND

This disclosure generally relates to monitoring of hydrocarbon wellbores. In particular, this disclosure relates to systems and methods for monitoring a wellbore using Distributed Acoustic Sensing (DAS).

When performing subterranean operations, acoustic sensing may be used to measure many important properties and conditions of a wellbore, pipeline, other conduit/tube, or fluids used. For example, when performing subterranean operations, it may be desirable to monitor a number of properties related to the subterranean formation and/or conduits used downhole, including, but not limited to, pressure, temperature, porosity, permeability, density, mineral content, electrical conductivity, and bed thickness. Further, certain properties of fluids used in conjunction with performance of subterranean operations, such as pressure, temperature, density, viscosity, chemical elements, and the content of oil, water, and/or gas, may also be important measurements. In addition, downhole-logging tools based on sonic well logging systems may be used to measure downhole properties such as formation porosity, location of bed boundaries and fluid interfaces, well casing condition, and behind casing cement location and bonding quality. Monitoring properties and conditions over time may have significant value during exploration and production activities.

A DAS system may be capable of producing the functional equivalent of 10s, 100s, or even 1000s of acoustic sensors. Properties of downhole formations surrounding or otherwise adjacent to a wellbore may be monitored over time based on the acoustic sensing. Further, hydrocarbon production may be controlled, or reservoirs may be managed based on the downhole formation properties sensed by in-well acoustic measurement methods using a DAS system.

Acoustic sensing based on DAS may use the Rayleigh backscatter property of a fiber's optical core and may spatially detect disturbances that are distributed along the fiber length. Such systems may rely on detecting phase changes brought about by changes in strain along the fiber's core. Externally-generated acoustic disturbances may create very small strain changes to optical fibers. The acoustic disturbance may also be reduced or masked by a cable in which the fiber is deployed.

BRIEF DESCRIPTION OF THE DRAWINGS

These drawings illustrate certain aspects of certain embodiments of the present disclosure. They should not be used to limit or define the disclosure.

Figure 1:
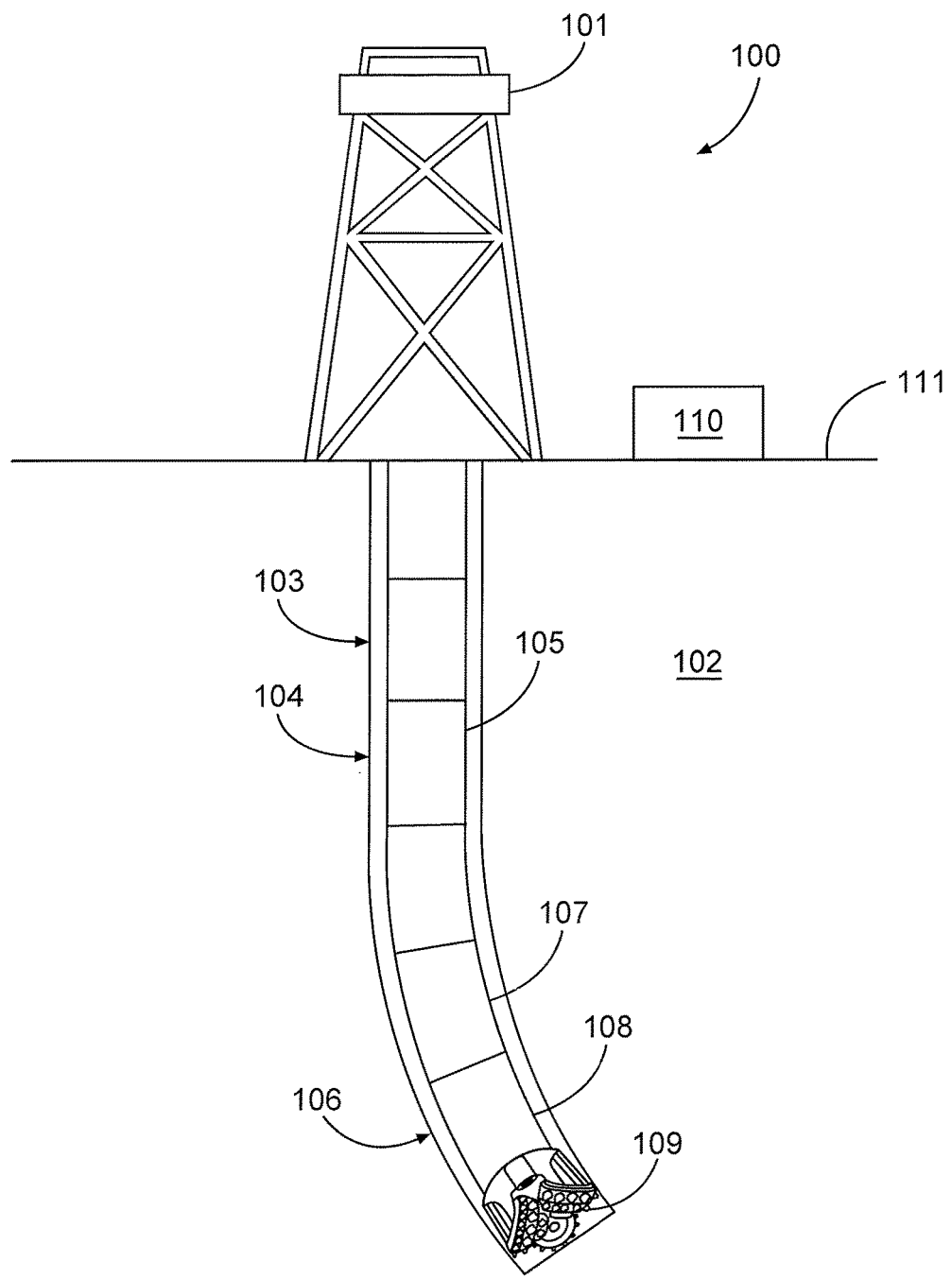
FIG. 1 depicts a hydrocarbon drilling site in accordance with one embodiment of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EE-PROM"), and/or flash memory; as well as communications media such as wires.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging-while-drilling/measurement-while-drilling (LWD/MWD). Certain embodiments may be applicable to subsea and/or deep sea wellbores. Embodiments described below with respect to one implementation are not intended to be limiting.

FIG. 1 illustrates an example drilling system 100 according to aspects of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device, and may communicate with elements of the BHA 106, in the LWD/MWD apparatus 107 and the steering assembly 108. In certain implementations, the control unit 110 may be an information handling system. The control unit 110 may receive data from and send control signals to the BHA 106. Additionally, at least one processor and memory device may be located downhole within the BHA 106 for the same purposes. The LWD/MWD apparatus 107 may log the formation 102 both while the wellbore 103 is being drilled, and after the wellbore is drilled to provide information regarding ongoing subterranean operations. The steering assembly 108 may include a mud motor that provides power to the drill bit 109, and that is rotated along with the drill bit 109 during drilling operations. The mud motor may be a positive displacement drilling motor that uses the hydraulic power of the drilling fluid to drive the drill bit 109. In accordance with an exemplary embodiment of the present disclosure, the BHA 106 may include an optionally non-rotatable portion. The optionally non-rotatable portion of the BHA 106 may include any of the components of the BHA 106, excluding the mud motor and the drill bit 109. For instance, the optionally non-rotatable portion may include a drill collar, the LWD/MWD apparatus 107, bit sub, stabilizers, jarring devices and crossovers. In certain embodiments, the steering assembly 108 may angle the drill bit 109 to drill at an angle from the wellbore 103. Maintaining the axial position of the drill bit 109 relative to the wellbore 103 may require knowledge of the rotational position of the drill bit 109 relative to the wellbore 103.

Figure 2:
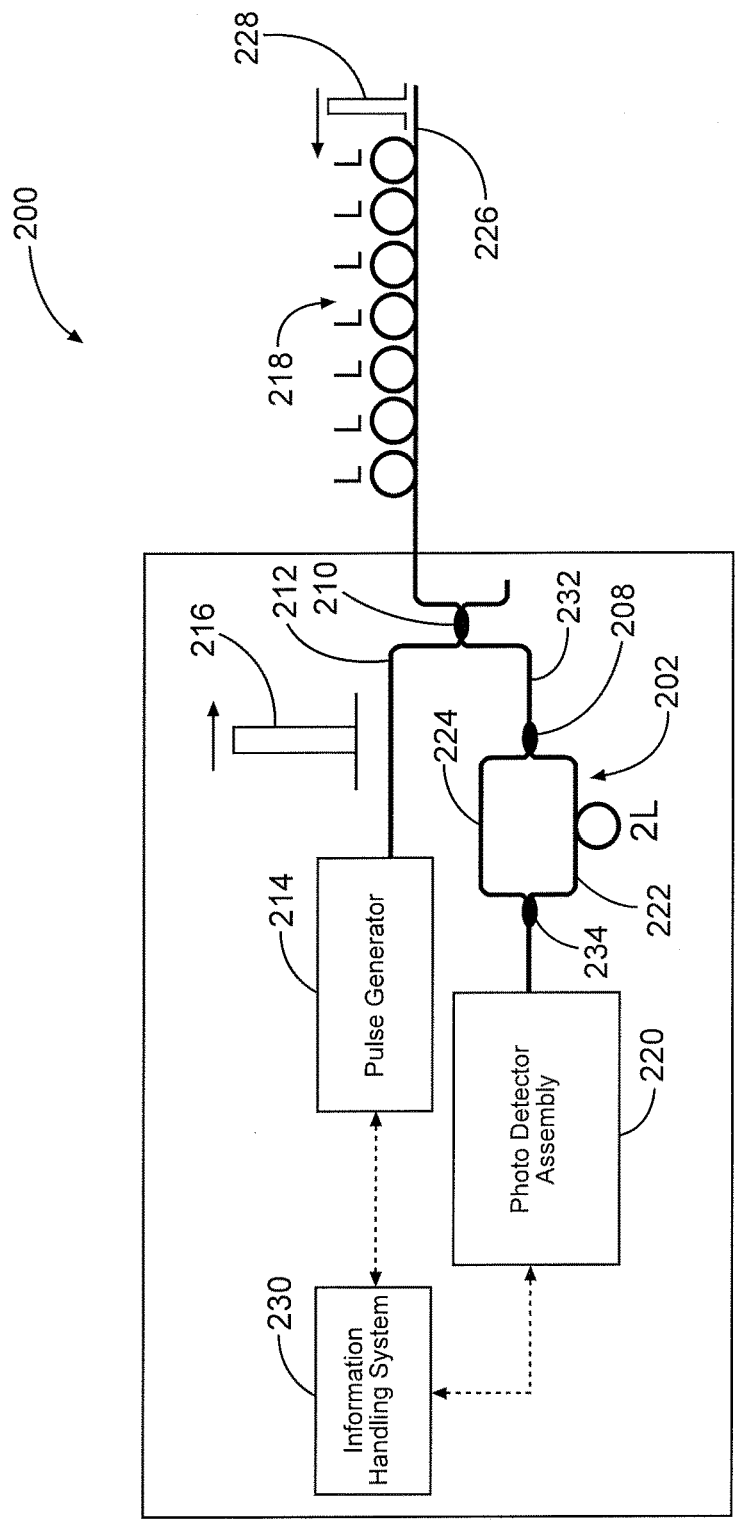
FIG. 2 depicts a distributed acoustic sensing system.

Referring now to FIG. 2, a system for performing Distributed Acoustic Sensing (DAS) is referenced generally by reference numeral 200. The system 200 may be incorporated into the drilling assembly 104 and lowered downhole using a drill string, by wireline, slickline, coiled tubing, or by any other means known to those in the art having the benefit of this disclosure. Alternatively, the system 200 or a portion of the system 200 may be positioned downhole for permanent monitoring and coupled to the casing or tubing. The system 200 may be a single pulse coherent Rayleigh scattering system with a compensating inferometer but is not intended to be limited to such.

Still referring to FIG. 2, a pulse generator 214 may be coupled to a first coupler 210 using the optical fiber 212. The pulse generator 214 may be located at any suitable location when performing subtenanean operations. For instance, in some embodiments, the pulse generator 214 may be located at the surface of the wellbore 103. The pulse generator 214 may include associated opto-electronics and laser. The first coupler 210 may be a traditional fused-type fiber optic splitter, a circulator, a PLC fiber optic splitter, or any other type of splitter known to those with ordinary skill in the art having the benefit of this disclosure. In other embodiments, the first coupler 210 may be a circulator. Optical pulses from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs).

Still referring to FIG. 2, a second coupler 208 may be coupled to an interferometer 202. The second coupler 208 may split light from the optical fiber 232 into two paths along a top interferometer arm 224 and a bottom interferometer arm 222. In other words, the second coupler 208 may split the backscattered light (e.g., backscattered light 228) from the optical fiber 232 into a first backscattered pulse and a second backscattered pulse. The first backscattered pulse may be sent into the top interferometer arm 222. The second backscattered pulse may be sent into the bottom interferometer arm 224. The first and second backscattered pulses from the top and bottom interferometer arms 222, 224 are then re-combined at a third coupler 234 to form an interferometric signal. The first, second, and third couplers 210, 208, and 232 may be a traditional fused type fiber optic splitter, a PLC fiber optic splitter, or any other type of splitter known to those with ordinary skill in the art having the benefit of this disclosure.

The interferometer 202 may be used to determine the relative phase shift variations between the light in the top interferometer arm 224 and the bottom interferometer arm 222 as they recombine. The interferometric signal, i.e., the relative phase shift, will vary over the distance of the distributed optical fiber 226, and the location of the interferometric signal can be determined using time of flight for the optical pulse 216. In the illustrative embodiment of FIG. 2, the interferometer is a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure.

The interferometer 202 may be coupled to a photodetector assembly 220. The photodetector assembly 220 may include associated optics and signal processing electronics (not shown). The photodetector assembly 220 may be a semiconductor electronic device that uses the photoelectric effect to convert light to electricity. The photodetector assembly 220 may be an avalanche photodiode or a pin photodiode but is not intended to be limited to such. As the light from the top interferometer arm 224 and the bottom interferometer arm 222 reach the third coupler 234, the photodetector assembly 220 may convert the optical signal (i.e., the interferometric signal) to an electronic signal proportional to the acoustic signal along the distributed optical fiber 226. The photodetector assembly 220 may be coupled to an information handling system 230. The photodetector assembly 220 and information handling system 230 may be communicatively and/or mechanically coupled. A first device may be communicatively coupled to a second device if it is connected to the second device through a wired or wireless communication network which permits the transmission of information. Thus, the information handling system 230 may be located uphole, downhole, or at a remote location. The information handling system 230 may also be communicatively or mechanically coupled to the pulse generator 214.

In operation of the system 200, the pulse generator 214 may generate a first optical pulse 216 which is transmitted through the optical fiber 212 to the first coupler 210. In certain implementations, the pulse generator 214 may be a laser. The first coupler 210 may direct the first optical pulse 216 through the optical fiber 226. At least a portion of the optical fiber 226 may be arranged in coils 218. As the first optical pulse 216 travels through the optical fiber 226, imperfections in the optical fiber 226 may cause a portion of the light to be backscattered along the optical fiber 226 due to Rayleigh scattering. Scattered light according to Rayleigh scattering is returned from every point along the optical fiber 226 along the length of the optical fiber 226 and is shown as backscattered light 228 in FIG. 2. This backscatter effect may be referred to as Rayleigh backscatter. Density fluctuations in the optical fiber 226 may give rise to energy loss due to the scattered light, with the following coefficient:

$$\alpha_{scat} = \frac{8\pi^3}{3\lambda^4} n^8 p^2 kT_f \beta$$

where n is the refraction index, p is the photoelastic coefficient of the optical fiber 226, k is the Boltzmann constant, and β is the isothermal compressibility. $T_f$ is a fictive temperature, representing the temperature at which the density fluctuations are "frozen" in the material. The optical fiber 226 may be terminated with a low reflection device (not shown). In certain implementations, the low reflection device (not shown) may be a fiber coiled and tightly bent to violate Snell's law of total internal reflection such that all the remaining energy is sent out of the fiber. In other implementations, the low reflection device (not shown) may be an angle cleaved fiber. In still other implementations, the low reflection device (not shown) may be a coreless optical fiber with high optical attenuation. In still other implementations, the low reflection device (not shown) may be a termination, such as the AFL Endlight.

The backscattered light 228 may travel back through the optical fiber 226, until it reaches the second coupler 208. The first coupler 210 may be mechanically coupled to the second coupler 208 on one side by the optical fiber 232 such that the backscattered light 228 may pass from the first coupler 210 to the second coupler 208 through the optical fiber 232. The second coupler 208 may split the backscattered light 228 based on the number of interferometer arms so that one portion of any backscattered light 228 passing through the interferometer 202 travels through the top interferometer arm 224 and another portion travels through the bottom interferometer arm 222. In other words, the second coupler 208 may split the backscattered light from the optical fiber 232 into a first backscattered pulse and a second backscattered pulse. The first backscattered pulse may be sent into the top interferometer arm 222. The second backscattered pulse may be sent into the bottom interferometer arm 224. These two portions may be re-combined at the third coupler 234, and at that point, they may generate an interferometric signal. In an interferometric signal, two signals are superimposed from points separated by a distance of L, where L is the difference in length between the top interferometer arm 224 and bottom interferometer arm 222. The output from the compensating interferometer 202, or the interferometric signal, includes backscattered interfered light from two positions. This interferometric signal may reach the photodetector assembly 220, where it may be converted to an electrical signal. The photodetector assembly 220 may integrate or add up the number of photons received in a given time period. The photodetector assembly 220 may provide output relating to the backscattered light 228 to the information handling system 230, which may convey the data to a display and/or store it in computer-readable media.

Figure 3:
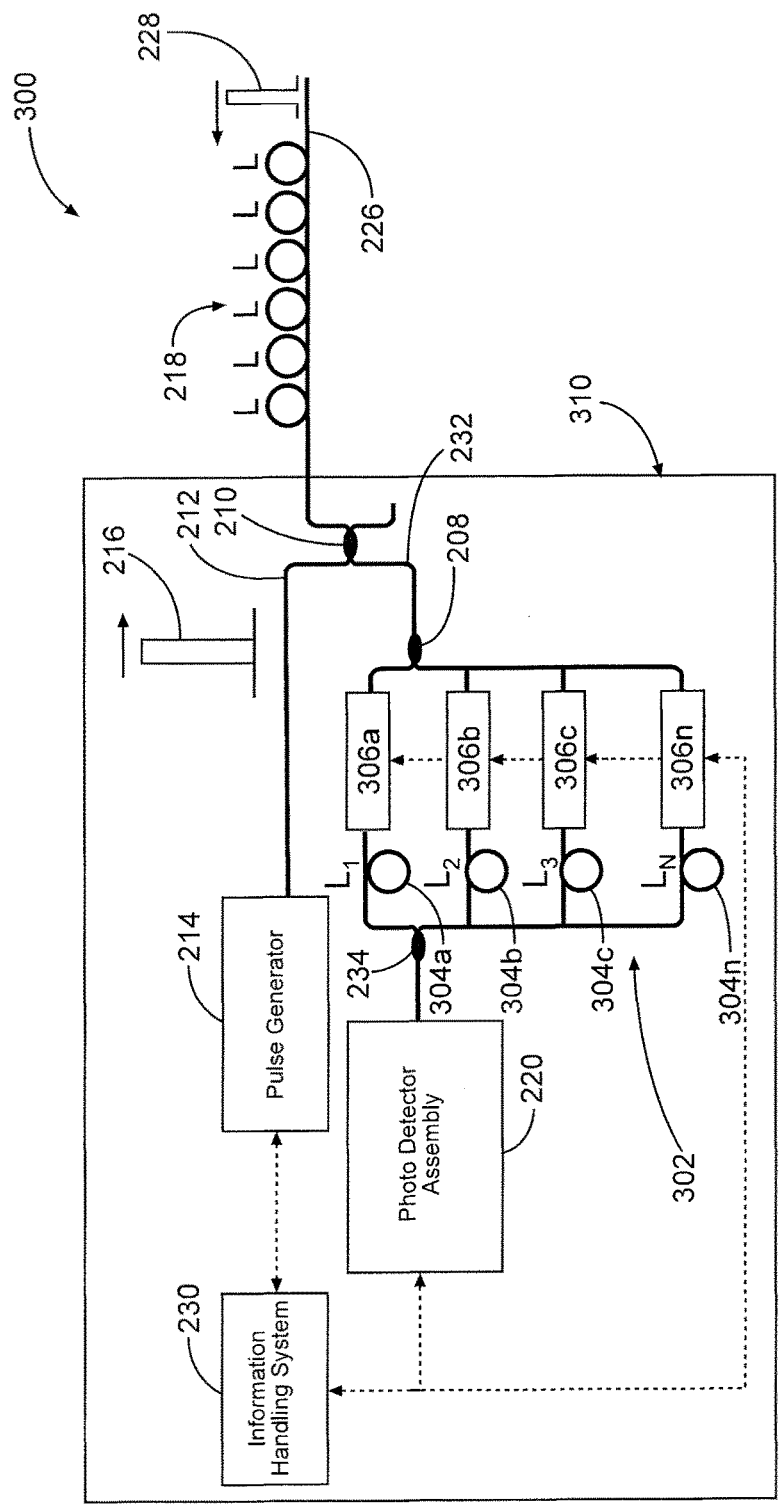
FIG. 3 depicts a distributed acoustic sensing system in accordance with one embodiment of the present disclosure.

Referring now to FIG. 3, an exemplary system for performing Distributed Acoustic Sensing (DAS) is referenced generally by reference numeral 300. A DAS interrogation unit 310 includes the information handling system 230, the pulse generator 214 coupled to the information handling system 230, the photodetector assembly 220 coupled to the information handling system 230, and an interferometer 302 coupled to the photodetector assembly 220. As shown in FIG. 3, the optical fiber 226 may be disposed between the interferometer 302 and the pulse generator 214 but other configurations are possible. The optical fiber 226 may be lowered downhole, but the DAS interrogation unit 310 may be located at the surface. Specifically, the optical fiber 226 may be coupled to a casing or tubing.

Still referring to FIG. 3, the system 300 may include the interferometer 302. The interferometer 302 may include three or more interferometer arms 304a-N that may be selectively engaged. Each interferometer arm 304a-N may be coupled to an optical gain element 306a-N, and each optical gain element 306a-N may be coupled to the information handling system 230. The interferometer arms 304a-N may each be of a different length. The interferometer arms 304a-N may be arranged in coils. However, the disclosure is not intended to be limited to any number or combination of coils. An optical gain element 306a-N may include any amplifier of optical transmissions that uses any suitable means to achieve desired gains and/or any desired attenuation element that may prohibit light from passing through the selected interferometer arms. An example of an attenuation element is a Variable Optical Attenuator (VOA). For instance, in certain implementations, a semiconductor optical amplifier or rare earth doped fiber or any other optical amplification medium known to those with skill in the art may be used to achieve gains. In some embodiments, the optical amplification medium may be replaced with VOAs that may be used to attenuate selected interferometer arms while allowing light to pass through other interferometer arms with minimum attenuation.

Still referring to FIG. 3, the interferometer 302 may be communicatively and/or mechanically coupled to a photodetector assembly 220. The photodetector assembly 220 may include associated optics and signal processing electronics. The photodetector assembly 220 may be coupled to an information handling system 230. The information handling system 230 may be located downhole, uphole, or at a remote location. A second coupler 208 may be part of the interferometer 302. A first coupler 210 may be coupled at one side to the second coupler 208 and at the other side, to an optical fiber 212. A pulse generator 214 may be coupled to the first coupler 210 using the optical fiber 212. The pulse generator 214 may include associated opto-electronics and a laser but is not intended to be limited to such. The pulse generator 214 may be located at any suitable location when performing subterranean operations. For instance, in some embodiments, the pulse generator 214 may be located at the surface of the wellbore 103.

In operation of the system 300, the pulse generator 214 may generate a first optical pulse 216 which is transmitted through the optical fiber 212 to the first coupler 210. The optical pulse may be optically amplified using optical gain elements, for example, Erbium Doped Fiber Amplifiers (EDFAs) or Semiconductor Optical Amplifiers (SOAs). The first coupler 210 may direct the first optical pulse 216 through the optical fiber 226. At least a portion of the optical fiber 226 may be arranged in coils 218. As the pulse 216 travels through the optical fiber 226, imperfections in the optical fiber 226 may cause light to be reflected back along the optical fiber 226. Backscattered light 228 according to Rayleigh scattering may be returned from every point along the optical fiber 226 along the length of the optical fiber 226. This backscatter effect may be referred to as Rayleigh backscatter. The optical fiber 226 may be terminated with a low reflection device (not shown). In certain implementations, the low reflection device (not shown) may be a fiber coiled and tightly bent to violate Snell's law of total internal reflection such that all the remaining energy is sent out of the fiber. In other implementations, the low reflection device (not shown) may be an angle cleaved fiber. In still other implementations, the low reflection device (not shown) may be a coreless optical fiber with high optical attenuation. In still other implementations, the low reflection device (not shown) may be a termination, such as the AFL Endlight.

Still referring to FIG. 3, the backscattered light 228 may travel back through the optical fiber 226 until it reaches the second coupler 208. The second coupler 208 may be coupled to an interferometer 302. The second coupler 208 may split the backscattered light 228 from the optical fiber 232 into various paths along the interferometer arms 304a-N. Two of the optical gain elements 306a-N may be active and turned on to allow light to pass through, and they may provide gain on two selected interferometer arms (for example, 304a and 304b) while all the other optical gain elements may be turned off to provide high attenuation. Thus, there may be high optical attenuation in the remaining interferometer arms (for example, 304c-N). The two active optical paths will form an interferometer, and the difference in path length will be dependent on which optical gain elements 306a-N are active and which optical gain elements 306a-N are turned off. Thus, the second coupler 208 may split the backscattered light from the optical fiber 232 into a number of backscattered pulses, based on the number of interferometer arms in the interferometer 302. A first backscattered pulse may be sent into a top interferometer arm. A second backscattered pulse may be sent into a bottom interferometer arm. The interferometer arms 304a-N may then be re-combined at a third coupler 234, and the first and second backscattered pulses from the selected active interferometer arms may be re-combined to form an interferometric signal. The interferometric signal is comprised of backscattered interfered light. In an interferometric signal, two signals are superimposed from points separated by a distance of L, where L is the difference in length between the top interferometer arm and bottom interferometer arm. The interferometric signal (i.e., the backscattered interfered light) may be representative of a downhole condition. For example, the downhole condition may include, but is not limited to: perforating, operating downhole hardware, monitoring downhole pumps, sensing acoustic signals during fracturing and in-flow stimulation, water injection, production monitoring, flow regimes, reflection seismic, microseismic, and acoustic events related to well-bore integrity (e.g. leaks, cross-flow, and formation compaction). The interferometric signal may also be representative of a condition on pipelines, flow-lines and risers related to flow, leaks, integrity, pigging and maintenance. Further, the interferometric signal may also be representative of conditions on subsea equipment where rotating equipment may cause vibration and/or acoustic noise. Similarly, the interferometric signal may be representative of a condition on infrastructure and security monitoring where it may be beneficial to dynamically vary the optical path length in the system 300.

Still referring to FIG. 3, the photodetector assembly 220 may convert the interferometric signal (i.e., an optical signal) to an electrical signal proportional to the acoustic signal along the distributed optical fiber 226. The photodetector assembly 220 may be an avalanche photodiode or a pin photodiode but is not intended to be limited to such. The photodetector assembly 220 may include associated optics and signal processing electronics that may be used to measure the voltage of the light incoming from the interferometer 202. The photodetector assembly 220 may be coupled to an information handling system 230. The photodetector assembly 220 and information handling system 230 may be communicatively and/or mechanically coupled. Thus, the information handling system 230 may be located uphole, downhole, or at a remote location. The information handling system 230 may also be communicatively and/or mechanically coupled to the pulse generator 214. The photodetector assembly 220 may integrate or add up the number of photons received in a given time period. The photodetector assembly 220 may provide output relating to the back reflected light to the information handling system 230, which may convey the data to a display and/or store it in computer-readable media.

The optical pulse 216 may travel down the length of the optical fiber 226 while generating backscattered light 228 from various positions along the length of the optical fiber 226. The time at which the optical pulse 216 is sent from the pulse generator 214, and the time it takes for the backscattered light 228 to travel to the photodetector assembly 220 may be measured accurately. The velocity of the optical pulse 216 as it travels down the optical fiber 226 may be well known. The location of any backscattered light 228 may then simply be calculated by measuring the time at which it reaches the photodetector assembly 220, i.e., a time-of-flight measurement. Using contiguous readings over the time it takes for the backscattered light 228 to traverse the optical fiber 218, a measurement may be collected at the photodetector assembly 220 relating to how the back reflected light varies over the length of the optical fiber 226.

The interferometer arms 304a-N may each be of a different length. Thus, various combinations of optical gain element 306a-N may be selectively activated such that the backscattered light 228 may travel through them and the interferometer arm 304a-N coupled to them, thereby varying the distance over which the reflected optical pulse 228 may travel. Each optical gain element 306a-N may be communicatively coupled to a control unit (not shown) such that a user may select which optical gain elements 306a-N may be engaged at any given time. In certain implementations, the control unit may be an information handling system. Alternatively, the optical gain elements 306a-N may be engaged according to an automated program. Thus, the sensitivity and spatial resolution of the system 300 may be changed in-situ depending on the needs of the system 300. Applications where active sources are used may generate strong acoustic signals, and users may prefer to have the system settings selected to provide higher spatial resolution with good signal-to-noise ratios. The well depth as well as the associated signal paths may vary. Thus, shallow applications may have a stronger signal, whereas signals in deep wells may experience higher signal attenuation due to the longer travel path for acoustic signals. It may therefore be beneficial to change the difference in path length to optimize the signal-to-noise ratio dependent on the attenuation of the acoustic signals or on the application. Other applications may include micro-seismic sensing and/or passive sensing where small micro-seismic events in the formation may generate noise, and it may be beneficial to record these events and use them for reservoir characterization and optimization.

The term "spatial resolution" as used herein refers to the ability to discriminate between two adjacent acoustic events along an optical fiber. It is generally desirable to have a fine spatial resolution in a system to allow for detection of events that are spatially near each other, like perforations in a hydrocarbon well, for example. The spatial resolution of the system 300 is a function of the width of the first optical pulse 216 and the difference in length between the top interferometer arm, which may be any of 304a-304(N−1) and the bottom interferometer arm, which may be any of 304b-304N, depending on which of the arms in the system have activated optical gain elements 306a-N. The sensitivity of the system 300 is a function of the difference in length between the top interferometer arm and the bottom interferometer arm, and a greater difference in length between these two fibers improves the system's sensitivity to acoustic and/or vibrational energy. In other words, greater sensitivity allows the system 300 to detect acoustic and/or vibrational events with smaller signal amplitude.

Additional optical pulses may be sent into the optical fiber 226 from the pulse generator 214 in close succession and at a fixed rate. By measuring the backscattered interfered light from each of these optical pulses at the photodetector assembly 220, a discrete representation of the change in acoustic energy in the wellbore may be measured as a function of time. The changes in acoustic energy may then be correlated with sub-surface events. For example, a change in acoustic energy may be related to a change in flow, a change in solids in a fluid, or a change in the oil/water/gas ratio present in the wellbore 103. The pulse generator 214 may be operable to vary the pulse width of optical pulses it generates. Further, the differential path length difference between two selected interferometer arms may be varied. In this way, the spatial resolution of the system 300 may be varied.

Figure 4:
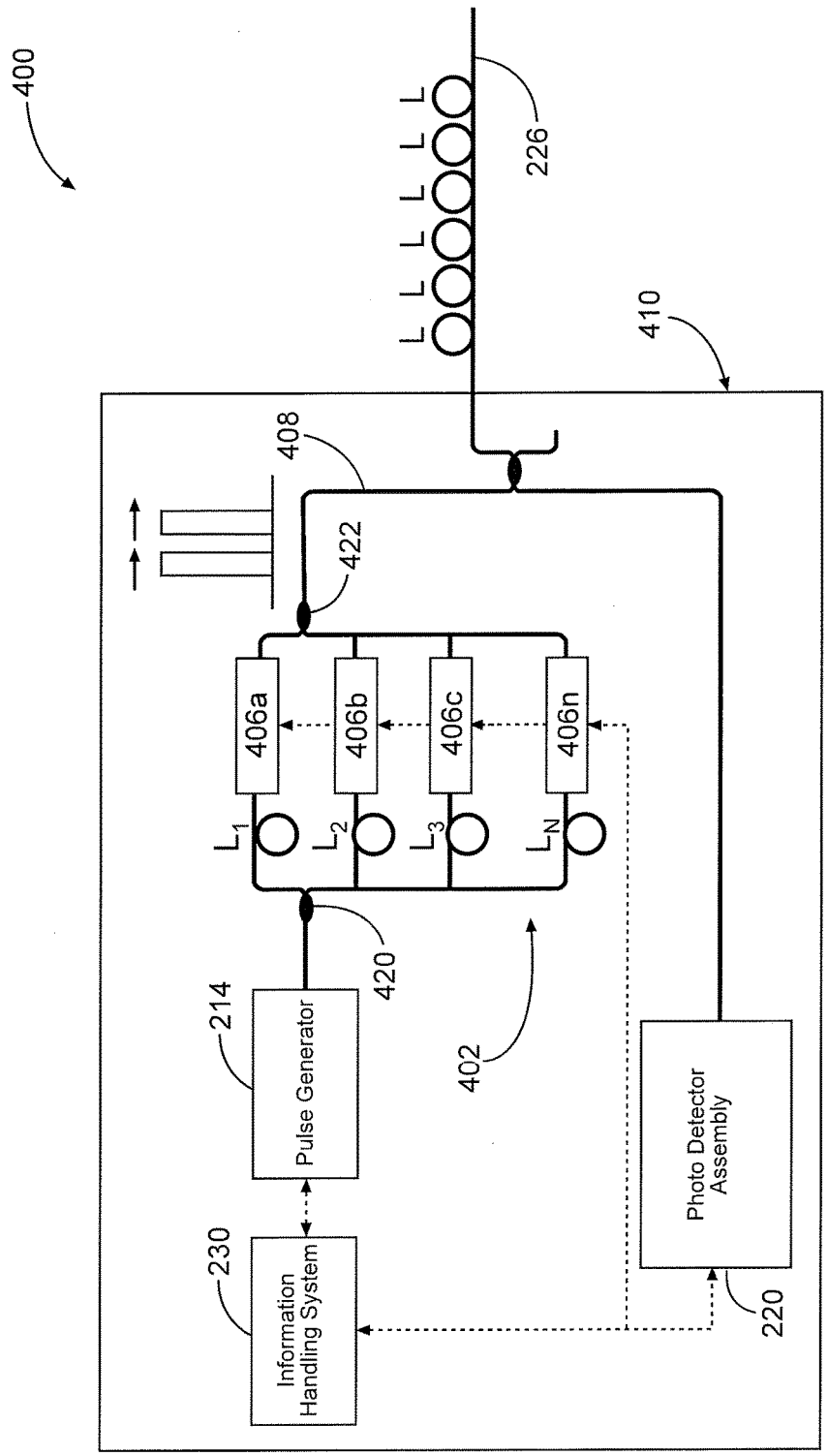
FIG. 4 depicts a distributed acoustic sensing system in accordance with an alternative embodiment of the present disclosure.

Referring now to FIG. 4, an exemplary system for performing Distributed Acoustic Sensing (DAS) according to an alternative embodiment of the present disclosure is referenced generally by reference numeral 400. As shown in FIG. 4, the interferometer 402 may be disposed between the pulse generator 214 and the optical fiber 226, although other configurations are possible. The pulse generator 214 may generate a single pulse that may be split in the first coupler 420 into N paths according to the number of active arms in the interferometer 402 (i.e., those arms of interferometer 402 that allow light transmission). For example, two of the N paths may be active. In this example, a first optical pulse may be split into a number of portions, according to the number of arms in the interferometer 402. A first portion of the first optical pulse may be sent into a first active arm of the interferometer 402. A second portion of the first optical pulse may be sent into a second active arm of the interferometer 402. The first portion and the second portion may then both reenter the optical fiber 408 at the second coupler 422. The two portions may be separated in time by a delay proportional to the difference in path length between the selected interferometer arms. Both portions may generate backscattered light as they travel down the optical fiber 226. The backscattered light from the first portion may then interfere with the backscattered light from the second portion. The two portions of backscattered light may interfere in the optical fiber 226, and they may travel in the optical fiber 226 to the photodetector assembly 220, where the backscattered interfered light may be converted to an electrical signal. As discussed with respect to FIG. 3, the backscattered interfered light may be representative of a downhole condition. The downhole condition may include, for example, perforating, operating downhole hardware, monitoring downhole pumps, sensing acoustic signals during fracturing and in-flow stimulation, water injection, production monitoring, flow regimes, reflection seismic, micro-seismic, and acoustic events related to well-bore integrity like e.g. leaks, cross-flow, formation compaction. The interferometric signal may also be representative of a condition on pipelines, flow-lines and risers related to flow, leaks, integrity, pigging and maintenance. The interferometric signal may also be representative of conditions on subsea equipment where rotating equipment cause vibration and/or acoustic noise. Similarly, the interferometric system signal may be representative of a condition on infrastructure and security monitoring where it may be beneficial to dynamically vary the optical path length in the system 400. The spatial resolution and sensitivity of the system 400 may be tuned by changing which optical gain elements 406a-N are active. As discussed with respect to FIG. 3, the pulse generator 214 may be operable to vary the optical pulse width. Further, the differential path length difference between two selected interferometer arms may be varied. In this way, the spatial resolution of the system 400 may be varied.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A distributed acoustic sensing system based on coherent Rayleigh scattering, comprising:
   a pulse generator, which generates an optical pulse;
   an optical fiber coupled to the pulse generator;
   an interferometer coupled to the optical fiber, further comprising:
     a first interferometer arm coupled to a first optical gain element;
     a second interferometer arm coupled to a second optical gain element; and
     a third interferometer arm coupled to a third optical gain element;
   a photodetector assembly coupled to the interferometer, wherein the photodetector assembly detects backscattered interfered light; and
   an information handling system, which activates two optical gain elements of the first optical gain element, the second optical gain element, and the third optical gain element so as to vary the optical path length of the interferometer, thereby changing the spatial resolution of the system.

2. The system of claim 1, wherein the first, second, and third interferometer arms have different lengths.

3. The system of claim 1, wherein the interferometer is disposed between the pulse generator and the optical fiber.

4. The system of claim 1, wherein the optical fiber is disposed between the interferometer and the pulse generator.

5. The system of claim 1, wherein the optical fiber is arranged in coils.

6. The system of claim 1, wherein the optical fiber is adapted to be disposed downhole.

7. The system of claim 6, wherein the optical fiber is coupled to at least one of a casing and a tubing.

8. The system of claim 6, wherein the backscattered interfered light is representative of a downhole condition.

9. The system of claim 8, wherein the downhole condition is selected from a group consisting of: perforations, monitoring downhole pumps and hardware, sensing acoustic signals during fracturing and in-flow stimulation, water injection, production monitoring, flow regimes, reflection seismic, micro-seismic, leaks, cross-flow, and formation compaction.

10. The system of claim 1, wherein the information handling system activates the first and third optical gain elements.

11. The system of claim 1, wherein the information handling system activates the first and second optical gain elements.

12. The system of claim 1, further comprising:
    a low reflection device coupled to the optical fiber.

13. The system of claim 1, wherein the pulse generator is operable to generate optical pulses having variable pulse widths.

14. The system of claim 13, wherein a portion of an optical pulse is reflected along the optical fiber according to Rayleigh backscatter.

15. A method for distributed acoustic sensing comprising:
    sending a first optical pulse down an optical fiber, wherein light from the first optical pulse is backscattered from positions along the length of the optical fiber according to coherent Rayleigh scattering;
    splitting backscattered light from the first optical pulse into a first backscattered pulse and a second backscattered pulse;
    activating a first optical gain element and a second optical gain element;
    sending the first backscattered pulse into a first arm of an interferometer, the first arm of the interferometer comprising the first optical gain element;
    sending the second backscattered pulse into a second arm of an interferometer, the second arm of the interferometer comprising the second optical gain element;
    combining the first and second backscattered pulses to form an interferometric signal;
    receiving the interferometric signal at a photodetector assembly;
    providing output relating to the interferometric signal to an information handling system.

16. The method of claim 15, further comprising:
    sending a second optical pulse down the optical fiber; and
    varying the activation of the first and second optical gain elements in the interferometer.

17. The method of claim 16, wherein light from the second optical pulse is backscattered from positions along the length of the optical fiber according to coherent Rayleigh scattering; the method further comprising:
    splitting backscattered light from the second optical pulse into a third backscattered pulse and a fourth backscattered pulse; and
    wherein varying the activation of the first and second optical gain elements in the interferometer comprises:
    activating the first optical gain element and a third optical gain element;
    de-activating the second optical gain element;
    sending the third backscattered pulse into the first arm of an interferometer;
    sending the fourth backscattered pulse into a third arm of an interferometer, the third arm of the interferometer comprising the third optical gain element.

18. A method for distributed acoustic sensing comprising:
    generating a first optical pulse;
    splitting the first optical pulse into a first portion and a second portion;
    activating a first optical gain element and a second optical gain element;
    sending the first portion into a first arm of an interferometer, the first arm of the interferometer comprising the first optical gain element;
    sending the second portion into a second arm of an interferometer, the second arm of the interferometer comprising the second optical gain element;
    combining the first portion from the first arm and second portion from the second arm;
    sending the first and second portions down an optical fiber, wherein light from the first and second portions is backscattered from positions along the length of the optical fiber according to coherent Rayleigh scattering to form an interferometric signal;
    receiving the interferometric signal at a photodetector assembly;
    providing output relating to the interferometric signal to an information handling system.

19. The method of claim 18, further comprising:
    generating a second optical pulse; and
    varying the activation of the first and second optical gain elements in the interferometer.

20. The method of claim 19, wherein light from the second optical pulse is backscattered from positions along the length of the optical fiber according to coherent Rayleigh scattering; the method further comprising:
  splitting the second optical pulse into a third portion and a fourth portion; and
  wherein varying the activation of the first and second optical gain elements in the interferometer comprises:
  activating the first optical gain element and a third optical gain element;
  de-activating the second optical gain element;
  sending the third portion into the first arm of an interferometer;
  sending the fourth portion into a third arm of an interferometer, the third arm of the interferometer comprising the third optical gain element.

* * * * *